May 29, 1956     E. R. WEATHERLY     2,747,500
TAMPING TOOL
Filed July 8, 1953     2 Sheets-Sheet 1
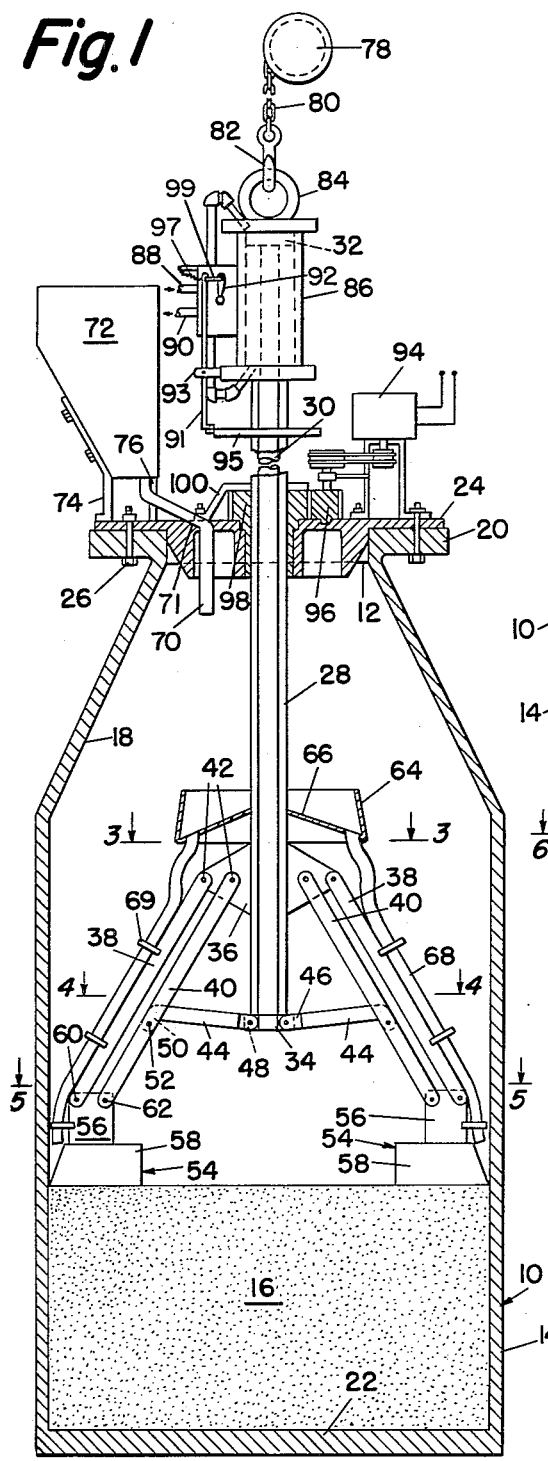
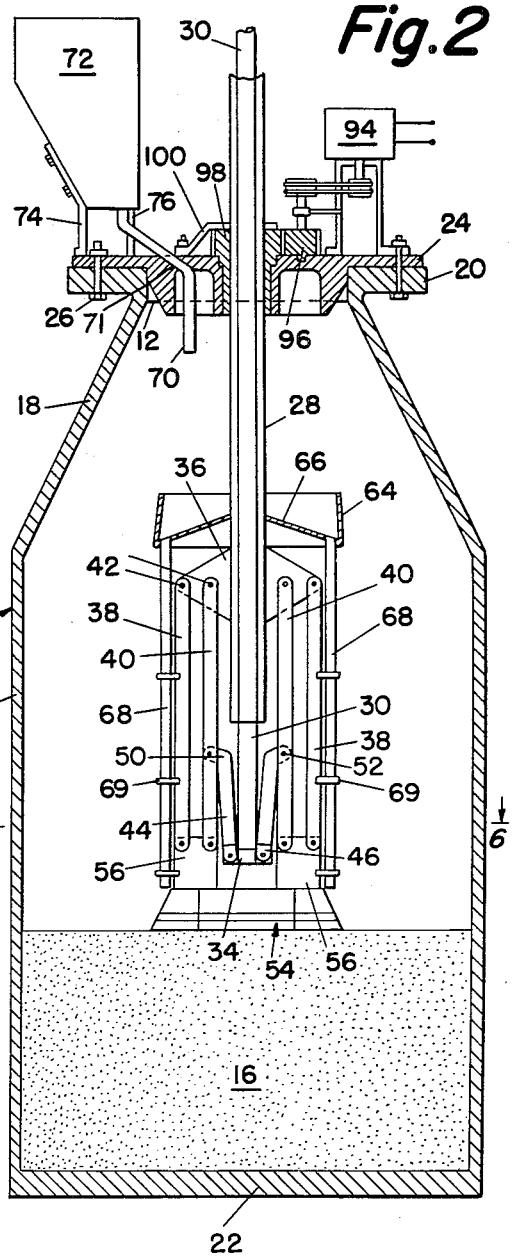
*INVENTOR.*
EARL R. WEATHERLY
BY
Robert O. Spurdle
ATTORNEY

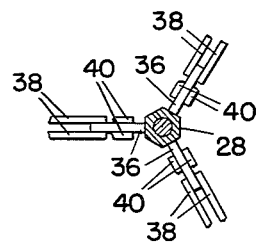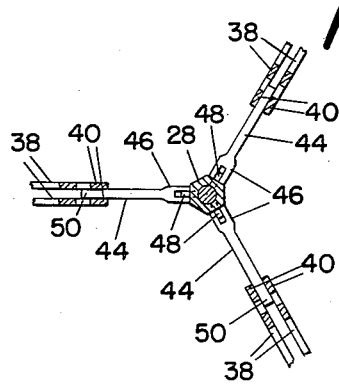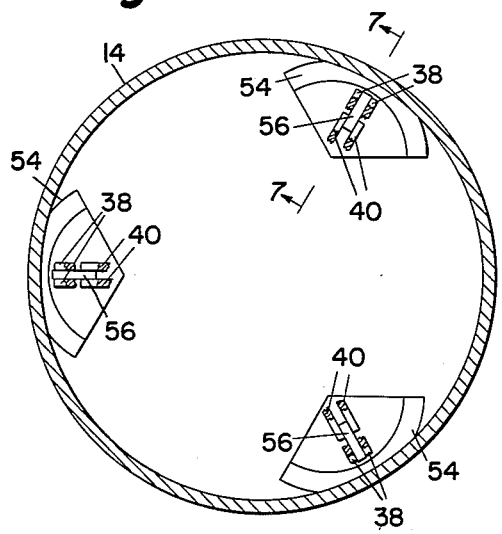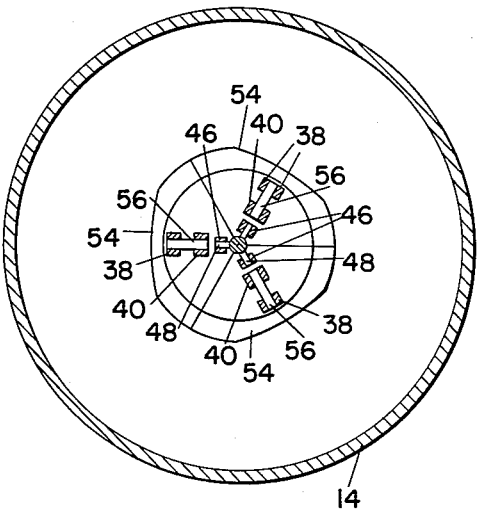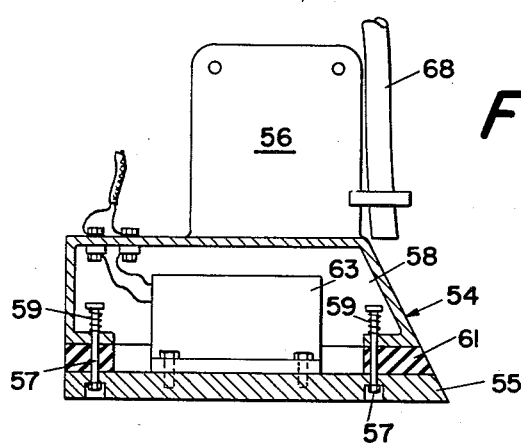

United States Patent Office 2,747,500
Patented May 29, 1956

2,747,500
TAMPING TOOL

Earl R. Weatherly, Media, Pa., assignor to Sun Oil Company, Philadelphia, Pa., a corporation of New Jersey Application July 8, 1953, Serial No. 366,766

7 Claims. (Cl. 100—217)

This invention refers in general to the preparation of adsorption beds for the treatment of hydrocarbons and more particularly to apparatus for tamping said adsorption beds into homogeneous masses for efficient operation.

In the separation of hydrocarbons by selective adsorption as disclosed in Patents 2,441,572 issued May 18, 1948, to A. E. Hirschler et al.; 2,576,525 issued November 27, 1951, to M. R. Lipkin; and similar processes, beds of silica gel are used. These beds are supported in cases connected in the stream of hydrocarbons and are shaped to facilitate production with the most efficient operation. In some instances the cases are constructed with a relatively small dimensional throat at the top through which the silica gel bed must be prepared. To operate correctly, it is required that this silica gel bed be homogeneous and sufficiently well tamped to prevent channeling of the liquid into streams to support the percolating effect.

The early preparation of these adsorption beds was accomplished manually. Small quantities of gel were put in the cases and tamped by hand tampers. As a result the bed was not homogeneous, but was streaked with belts of silica gel in varying densities. These denser masses promoted channeling and prevented the desirable percolating action. It is an object of this invention to provide a mechanical tamping device adapted to produce an adsorption bed homogeneous throughout its volume.

A further object is to provide a mechanical tamping device collapsible for insertion in cases of restricted opening, expandable within the case and operable as a tamper in all positions between the collapsed and expanded positions.

It is also a further object of this invention to provide a tamping apparatus adapted to transmit the bed material through the device to the areas being tamped.

Other objects and advantages of the invention will be apparent during the course of the following description.

In the accompanying drawings, forming a part of this specification, and in which like numerals are employed to designate like parts throughout the same, Figure 1 is an elevational view in partial section of the device in one operating position;

Figure 2 is an elevational view in partial section of the device, omitting portions of Figure 1 for clarity, showing another operating position;

Figure 3 is a partial sectional view of Figure 1 taken on line 3—3;

Figure 4 is a partial sectional view of Figure 1 taken on line 4—4;

Figure 5 is a partial sectional view of Figure 1 taken on line 5—5;

Figure 6 is a partial sectional view of Figure 2 taken on line 6—6;

Figure 7 is an elevational view in section of an element of the device.

As indicated above, the primary purpose of the device disclosed and described here is to obtain a uniformly dense bed of adsorption materials for use in chemical processes. However, it is not enough that the tamping be made fully mechanical. It is a further requirement that the adsorption bed be formed in a case having a constricted opening. To meet the mechanically packed bed requirement under these circumstances, a tamping apparatus of special construction and operating characteristics is required.

Referring now to the figures of the drawing illustrating one form of a device meeting these requirements, Figures 1 and 2 together show the complete combination in the extreme operating positions. Figures 3 to 6 are details of specific elements, illustrating the solution of problems arising in the device. The concluding figure, number 7, shows the construction of the vibrating element, or shoe, which contributes to the uniform packing of the absorption bed.

A typical casing 10, constricted at the top opening 12, is shown in Figures 1 and 2. The lower portion 14, cylindrical in section as indicated in Figures 5 and 6, forms the retaining volume of the body of adsorbent materials 16. A sloping wall 18, conical in form, connects the lower cylindrical portion 14 to the constricted opening 12. Around this opening, a flange 20, normally used to secure a cover plate (not shown) to the case 10, is adapted to supporting the tamping tool. Completing the case 10, the bottom 22 is formed as an integral part requiring all operations to be performed through the limited top opening 12.

For easy, rapid and secure engagement with the flange 20 of the case 10, a support plate 24 is fitted to engage the opening 12. Bolts 26, or like fasteners, position the plate and hold it against movement during the tamping operation. In addition to orienting and fastening the device in operating position, plate 24 is the assembly means for the operating elements and is properly designated as the "support." Where large cases must be tamped, the support plate 24 also serves as a walk-way for the necessary attending operators.

Extending through the support plate 24 into the case 10, a sleeve 28 hexagonal in external shape, as detailed in sectional Figures 3 and 4, is concentrically arranged. A plunger 30 with a piston 32 at the upper end and a bracket 34 at the lower end passes through the sleeve 28 in longitudinally sliding engagement.

Spaced 120 degrees apart around the hexagonal sleeve 28, three brackets 36 form the connectors for the three sets of parallel arms 38—38 and 40—40. Reference to Figures 1, 2 and 3 will make this structure clear. Pivotal connections 42—42 repeated for each pair of parallel arms link these arms 38—38 and 40—40 to the respective brackets 36. Single crank arms 44, bifurcated on the inwardly projecting end at 46, are pin-connected through the bifurcation to lugs 48 projecting from the bracket 34 on the lower end of the plunger 30. On the outwardly projecting end of the crank arms 44, an angled construction 50 is adapted for clearance purposes which will be fully understood in reading the description of the operation of the device. Below the angle bend 50 the arm 44 is pin-connected at 52 between the inner arms 40—40 as shown on Figure 4.

At the bottom of the device, three vibrating shoes 54 are shown. In Figures 1, 2, 5 and 6, these shoes are shown in various operating positions. Figure 7 is a sectional view of the shoe 54 showing the necessary details.

Considering first the general arrangement of the device and the vibrator shoes in that relation, reference is made to these figures, excepting Figure 7. By means of a single supporting plate 56 attached to the body 58 of the vibrating shoe 54, the three sets of parallel arms 38 and 40 are pivotally connected as at pins 60—62. It will be evident that any change in position of the parallel arranged arms will keep the vibration shoe 54 horizontal with the bottom of the case, once it has been fixed in that relative position. Comparison of Figures 1 and 2 showing the tamper in extreme operating positions, emphasizes the cooperating advantages of the parallel arm and shoe construction.

Before discussing the vibrator 54 in detail, Figures 5 and 6 are considered to point out further advantages present in this disclosure. The uniform density of the adsorbent material bed 16 can be obtained only if the tamper is capable of uniform operation over the entire bed surface. To this end the vibrator body members 58 are shaped to engage the casing on the arc of the internal surface when extended as in Figure 5, and to nest together covering the center of the bed when contracted, as in Figure 6.

After considering the structure necessary to transmit the adsorbent material into the casing and in position for tamping, the means to move the shoes into various positions will be considered. Mounted on the hexagonal sleeve 28 in fixed position so as to move in all directions with the sleeve, an adsorbent material receiver 64 is fixed. As shown it is in the form of a pan with a conical bottom 66 sloped to direct the adsorbent to the outer periphery. Hoses 68 of sufficient diameter direct the material to be bedded from the receiver 64 to the area of the vibrator shoe 54. Clips 69 hold hoses 68 in operating position on the parallel arms 38. Apertures in the pan open into the hoses.

Above the receiver 64 and in line therewith as it moves in response to the movement of the sleeve 28, a fixed conductor 70 feeds the material through aperture 71 in the support plate 24. A hopper 72 is positioned by brackets 74 and 76 above the plate 24 in connection with the conductor 70.

Movement of the shoes and supporting structure which extends into the case 10 has been mentioned above. To achieve the best results, it is necessary that the vibrators 54 move vertically, horizontally and rotate. The remainder of the mechanism operated outside the case 10, a large part of which is supported by the plate 24, is arranged to cause these motions, in operative cooperation.

Vertical motion of the entire device such as is required for inserting or removing the tamper from the case, and also in tamping the bed material, is arranged by an external lifting means. This means is symbolized by a reel 78, a chain 80 and a hook 82. A crane or general hoisting rig may be necessary for use with large cases mounted above the ground. Any lifting means capable of handling the weight of the device is acceptable. The hook 82 is arranged to engage a ring 84 by which the device is suspended.

The expansion and contraction of the vibrators 54 to and from the walls of the case is obtained through vertical motion of the plunger 30. The piston 32 forming the upper end of the plunger is received in the cylinder 86 to which the ring 84 is attached and from which the device is suspended by contact with the hexagonal sleeve 28. Air inlet and outlet, 88 and 90 respectively, transmit compressed air to either side of the piston 32 as selected by means of the valve handle 92, automatically through the cam connection 91, the fulcrum 93 and the cam 95. A spring 97 and link 99 hold the connector 91 in operating position relative to the handle 92 and the cam 95. Thus the plunger is lifted or lowered a full cylinder stroke as desired. This motion is transmitted to the vibrators moving them horizontally by moving the linkage of arms 38—40 and 44 described above. These specific elements are omitted from Figure 2 for clarity, as noted.

To rotate the vibrator shoes during the tamping action, an electrical motor 94 is mounted on the plate 24 and belt connected to the driving gear 96. A driven gear 98 is slotted to receive the hexagonal shaped sleeve 28 and pass it in sliding engagement without binding. This driven gear 98 is shown extending through the depth of the support 24 for full engagement with the hexagonal sleeve 28 and is retained in vertical position by the plate 24 beneath and a bracket 100 above it. Cylinder 86 may be arranged to remain fixed while sleeve 28 rotates relative to the cylinder. The mechanical details for rotation of the sleeve relative to the cylinder is not completely shown since it forms no part of this invention, is considered a matter of mechanical skill, and any well known means may be utilized.

Referring now to Figure 7 the internal structure of the vibrator 54, generally detailed above, will be considered. The connecting bracket 56 is mounted on the top of the body 58 and provides the means for moving the vibrator in the desired direction. A sole plate 55 is resiliently attached to the body 58 by bolts 57, held flexibly firm by compressed springs 59. A rubber gasket 61 insures a resilient connection between the vibrating sole plate and the body member to reduce the vibration transmitted to the connections. The vibrator motion is supplied by a commercially available vibrator 63 which is mounted directly on the sole plate 55. Electrical power is supplied in the normal fashion.

Although the above disclosed mechanism is repeatedly referred to as being intended for tamping adsorbent materials, it will be recognized from reading the following description of its operation that it can be used for any tamping purpose where a bed of uniform density is required. The operating description will be begun considering that the case in which the material to be tamped has been cleaned and made ready.

The device, connected to receive compressed air and electricity at the proper points, is picked up by the lifting means 78 and suspended above the case 10. An operator can ride the support plate 24 with the necessary bolts 26 available in large operations. By operating the valve 92 compressed air is admitted into the cylinder 86 and drives the plunger 30 downward. The vibrators are drawn into the contracted position shown in Figures 2 and 6 and reduced to the minimum diameter for insertion in the contracted opening 12 in the top of the case 10. The device is lowered and the support plate 24 oriented and bolted in place. A quantity of material is placed in the hopper 72 and the rotating motor 94 started together with the vibrators 54. The material for tamping is distributed through the receiver 64 to the vibrator loci through the hoses 68.

As the sleeve 28 slowly rotates relative to cylinder 86 fixed against rotation, the cam 95 operates the air valve 92 by the connector 91 moving against the cam periphery. It is evident that this cam may be cut to operate the valve 92 as frequently as desired during a revolution of the device. For each full stroke of the piston 32, the vibrators are moved from one extreme position to the other shown in Figures 1 and 2. In this way the vibrated surfaces under the separate shoes are interlaced in close and repeated actuation forming the desired mass. The material for tamping is fed continuously to the changing pressure areas of the separate vibrators through the hopper 72.

From time to time the lifting means 78 raises the tamping device to place the vibrators on top of the tamped mass. As each successive layer is vibrated into place the mechanism is raised closer to the top and the contracted area. Ultimately the receiver 64 will bear upwardly on the underside of the support plate 24 and the tamping is finished. By withdrawing the shoes to the contracted position and releasing the plate, the device is free to be withdrawn.

Although the device described is one form of mechanism adapted to achieve the desired results, it will be apparent to those versed in the art that substitutions and changes may be made without departing from the spirit of the invention. Further, with slight change in the body of the vibrator and the cam, the device described may be used in a wide variety of vessels. With such modifications evident it is intended that the scope

I claim:

1. A tamping tool for use in receptacles with constricted openings comprising a support plate, a sleeve extending through the plate in sliding engagement therewith, a plurality of laterally movable vibrators suspended from the sleeve, means to control the lateral movement of said vibrators through the sleeve, rotating means engaging said sleeve, means for coordinating the rotary motion and lateral movement of the vibrators, and means to conduct the material to be tamped through the plate to the loci of the vibrators.

2. A tamping tool for use in receptacles with restricted openings comprising a support plate, a sleeve slidably extending therethrough, a plurality of laterally movable vibrators suspended from the sleeve, a plunger slidably positioned in said sleeve to extend above and below the ends thereof, pivotally connected arms linking the lower end of the plunger to each of the vibrators, lever operated fluid responsive means cooperatively engaging the upper end of the sleeve and adapted to receive the extension of the plunger in operating engagement, means to rotate said sleeve and suspended vibrators, means for coordinating the rotary and lateral movements of said vibrators, and feeding means to transmit material to be tamped through the support plate to the loci of the vibrators.

3. The device in claim 2 further characterized by the means for coordinating rotary and lateral movement of the vibrators including a cam responsive to the movement of the rotatable sleeve, and a connector linking the cam and lever of the fluid operated means controlling said plunger.

4. The combination with a casing adapted to receive and accumulate material to be tamped, vibrators spaced apart along different radii of the casing, a rotatable sleeve extending axially within the casing, link connections between the vibrators and the sleeve allowing the vibrators to move circumferentially, laterally and vertically to thereby tamp material fed to the casing throughout the area of the bed of material at any level thereof, a receiver carried by the sleeve and adapted to receive the material, means to feed the material from the receiver downwardly and laterally toward the wall of the casing to thereby build up the bed of the material, a plunger extending axially of the casing, link connections between the plunger and the link connections between the sleeve and the vibrators, means to reciprocate the plunger to thereby, through the said link connections, effect vertical and lateral movement of the vibrators, and means to rotate the sleeve and thereby, through the link connections between the sleeve and the vibrators, rotate the vibrators.

5. A device for tamping material in a case, said device comprising means for feeding the material to the peripheral part of the case at different radial locations, vibrators adapted to overlie the material fed to the case and positioned therein along different radii, and means providing for lifting the vibrators as the level of material rises during the feed of material to the case and to impart to the vibrators lateral movement between the central and peripheral parts of the case and also circumferential rotary movement; said means comprising a sleeve extending vertically within the case, links connecting the sleeve with the several vibrators, a vertically reciprocable plunger extending through the sleeve, links connecting the plunger with the aforesaid links, the reciprocation of the plunger moving, through the specified linkages, the vibrators back and forth between the central and peripheral parts of the case, a motor connected with and operative to rotate the sleeve and thus, through the links first specified, imparting to the vibrators a circumferential rotary movement, and mechanism above the case operative to reciprocate the plunger and to lift the tamping assembly of plunger, sleeve, linkages and vibrators as the level of material in the case rises.

6. A tamping device as defined in claim 5 in which the body of the case is cylindrical and has a top opening of reduced diameter, movement of said plunger to retract said vibrators toward the center of the case allowing insertion and removal from the case of the assembly of sleeve, plunger, vibrators and linkages, and a supporting plate securable to said open top and through which said plunger and sleeve are vertically slidable after the supporting plate is applied, said mechanism and motor being supported above said plate.

7. A tamping device as defined in claim 5 in which the means for feeding the material to the case comprises a hopper, a receiver carried by said sleeve, a material-conveying conduit extending from the hopper and having its discharge opening above said receiver, and material-conveying conduits extending from the receiver toward the peripheral part of the case at different radial locations.

References Cited in the file of this patent

UNITED STATES PATENTS

| | | |
|---|---|---|
| 130,461 | Zimmerman | Aug. 13, 1872 |
| 649,449 | Hardy | May 15, 1900 |
| 1,113,809 | Mengle | Oct. 13, 1914 |
| 1,175,157 | Ludden | Mar. 14, 1916 |
| 1,271,957 | Keys | Mar. 6, 1917 |
| 2,395,898 | Mohr | Mar. 5, 1946 |

FOREIGN PATENTS

| | | |
|---|---|---|
| 381,114 | Great Britain | Sept. 29, 1932 |